United States Patent [19]

Rauer et al.

[11] 4,129,531
[45] Dec. 12, 1978

[54] CROSSLINKING OF POLYMERS WITH AZO-ESTERS

[75] Inventors: Kurt Rauer; Harald Hofmann, both of Guenzburg; Heidelinde Schiller, Norderstedt, all of Fed. Rep. of Germany; Chester S. Sheppard, Kenmore, N.Y.

[73] Assignee: Pennwalt Corporation, Philadelphia, Pa.

[21] Appl. No.: 860,353

[22] Filed: Dec. 14, 1977

[51] Int. Cl.² .............................................. C08J 9/10
[52] U.S. Cl. .................................. 521/94; 260/42.33; 260/42.37; 260/42.46; 521/88; 521/90; 521/143; 521/149; 521/148; 526/51
[58] Field of Search ........... 260/2.5 HA, 2.5 R, 2.5 N

[56] References Cited

U.S. PATENT DOCUMENTS

| 3,306,862 | 2/1967 | Mageli et al. | 260/2.5 HA |
| 4,029,615 | 6/1977 | Kowens et al. | 260/2.5 N |

*Primary Examiner*—Morton Foelak

[57] ABSTRACT

A method is provided for crosslinking polymers at temperatures above 170° C using azo-esters having the formula

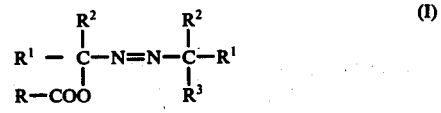

wherein $R^3$ is —OOC—R, alkyl, cycloalkyl or aralkyl.

7 Claims, No Drawings

CROSSLINKING OF POLYMERS WITH AZO-ESTERS

BACKGROUND OF THE INVENTION

1. Field of Invention

This invention relates to a method of crosslinking or simultaneously crosslinking and-foaming of polymers using a high decomposition temperature azo-ester crosslinking agent.

2. Description of the Prior Art

Prior to the present invention, azo compounds generally were thought to be unable to abstract a hydrogen atom from a carbon atom and, hence, were unable to perform as a crosslinking agent for polymers. U.S. Pat. No. 3,152,107 was the first published exception to this general rule; it described the crosslinking effect of unsymmetrical aromatic azo compounds wherein one side of the azo group (—N=N—) is attached directly to the aromatic nucleus and the other side of the azo group is attached to an aliphatic radical with a strongly electrophilic group like a carbonamide group attached to the α-carbon atom thereof. Examples of such compounds are as follows:

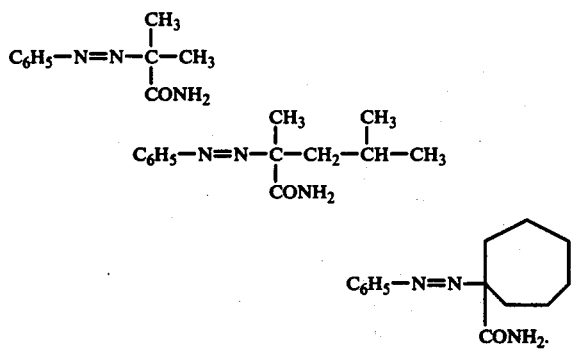

These azo compounds have not been found commercially acceptable hitherto, probably because of their relatively high price and their color which is presumably due to the presence of the chromophoric azo group attached to the aromatic ring; this color represents a severe disadvantage in many applications because decomposed residue of the crosslinking agent causes undesirable discoloration of the polymer.

U.S. Pat. No. 3,776,885 is a second exception to the abovementioned general rule; it describes aliphatic symmetrical and asymmetrical azo-ethers having the following structures:

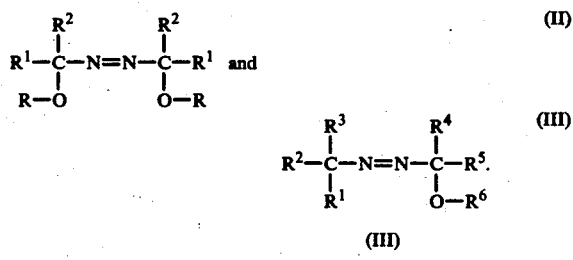

These azos are good crosslinking agents for polymers in the temperature range of 120° to 230° C. Nevertheless, when comparing these azo ethers (II) and (III) with the azo-ester (I) of the present invention, the azo ester has a higher decomposition temperature for analogously structured compounds, i.e., made from the same ketone.

Other differences of the azo ester (I) of the present invention are their simpler and cheaper preparation, lower volatility, solid state (in many instances), and low or lack of toxicity. For example, the azo ether, 2,2'azo-bis(2-methoxy propane) is a toxic liquid while the corresponding azo ester, 2,2'azo-bis(2-acetoxy-propane) is a colorless power melting at 103° C.; similarly the azo ether, 1,1'azo-bis(1-methoxycyclohexane) is an orange-yellow oil solidifying at about 0° C. while the corresponding azo ester, 1,1'azo-bis(1-acetoxycyclohexane) is a colorless powder melting at 91°–94° C.

Organic peroxides and diperoxides are normally used as crosslinking agents for crosslinking polymers. Peroxides, however, cannot be used when the softening temperature of the polymer is above the decomposition temperature of the peroxide because the peroxide would decompose before being completely mixed with the polymer. On the other hand, the high decomposition temperature of the azo ester of this invention makes it possible to mix them with such polymers having a softening temperature higher than the decomposition temperature of the peroxides such as dicumyl peroxide, α,α'-bis(t-butylperoxy)-p(m)-diisopropylbenzene, 2,5-dimethyl-2,5-bis(t-butylperoxy)hexane, 2,5-dimethyl-2,5-bis(t-butylperoxy)hexyne(3), di-t-butylperoxide, etc. Azo esters can effect foaming during crosslinking in the absence of pressure; peroxides cannot. Crosslinking with the azo ester under pressure, however, gives compact unfoamed polymers in the same way and in the same order of magnitude as when peroxides are used.

The commercially available azo-compounds used technically as initiators are symmetrical azonitriles of the general structure:

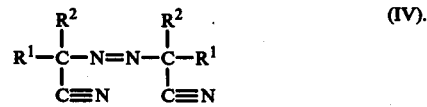

The most known representative of the azonitriles is 2,2'azo-bis-isobutyronitrile. The azonitriles have a decomposition temperature range of about 60°–80° C. below that of the abovementioned crosslinking peroxides and about 80°–110° C. below that of the azo-ethers (II) and (III) and the azo-ester (I) of the present invention. These azonitriles cannot effect crosslinking reactions in polymers (see Example 4, infra).

STATEMENT OF INVENTION

The present invention provides a method of crosslinking polymers such as polyethylene or ethylene-vinylacetate copolymer at high temperatures over 170° C. which are free from, or at least reduce, the problems associated with the use of prior art crosslinking agents. Saturated and unsaturated homo- and copolymers are crosslinked under pressure in the range of 0 to 300 psia and at a temperature above 170° C., but not to the point where the polymer will substantially degrade, in the presence of 0.5% to 20% of the azo ester (I) crosslinking agent. This azo ester (I) can be used singularly or in combination with other crosslinking agents such as another azo-ester, azo-ether or peroxide. Further, the azo-ester can be used in combination with another crosslinking agent as mentioned supra and a foaming agent.

The azo ester crosslinking agent of this invention has the following formula

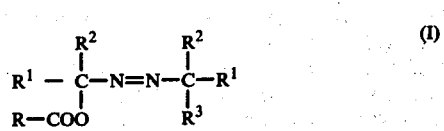

(I)

in which
- $R^3$ is selected from the group consisting of —OOC—R, alkyl, cycloalkyl and aralkyl;
- R is selected from the group consisting of H, lower alkyl, cycloalkyl, aryl and aralkyl;
- $R_1$ and $R_2$ are independently selected from the group consisting of alkyl, cycloalkyl, aryl and aralkyl wherein each of the groups may have alkylbranching;
- $R^1$ and $R^2$ can join together to form $R^1R^2$ where the group is selected from —(CH$_2$)$_4$—, —(CH$_2$)$_5$—, alkylsubstituted tetramethylene, or alkylsubstituted pentamethylene; and
- R and $R^1$ can join togehter to form $RR^1$ where the group is selected from —CH$_2$—CH$_2$, —CH$_2$—CH$_2$—CH$_2$—, alkylsubstituted —CH$_2$—CH$_2$— or alkylsubsittuted —CH$_2$—CH$_2$—CH$_2$—.

The azo ester (I) is a good crosslinking agent for polymers that will also simultaneously foam the polymer under atmospheric pressure.

DETAILED DESCRIPTION OF INVENTION

The preferred moieties of R, $R^1$, $R^2$ and $R^3$ of the present invention are the alkyl of 1–4 carbons, cycloalkyl of 3 to 6 carbons, aryl of 6–10 carbons and aralkyl of 7–11 carbons. All of these moieties may be substituted with non-interfering substituents such as alkyl or halogen such as chloride or bromide. Examples of the preferred aryl moieties are phenyl and naphthyl. Examples of the preferred aralkyl moieties are benzyl, phenylalkyl or naphthyl-alkyl.

The azo-ester (I) of the present invention is a good crosslinking agent for polymers at high temperatures above 185° C. This azo ester starts to show crosslinking activity from about 170° C. depending upon the nature of the substituents of the azo compound. The upper limit of this temperature range is controlled by the degrading temperature of the particular polymer or copolymer. The optimal temperature range for crosslinking is between 180°–230° C. The azo ester (I) is used in amounts of 0.5–20%, preferably 2–7% by weight in a reaction time of 10–100 minutes. The pressure in the reactor can range from 0 to 300 psi. For crosslinking, two of the species of the azo ester of this invention can be used in combination with each other, with azo-ethers, and with peroxides. Azo initiators form nitrogen when they decompose. Hence, they can act also as blowing agents as long as no pressure is applied. In order to obtain a crosslinked foamed polymer with the desired cellular structure, the azo ester (I) can be combined with another crosslinking agent having a somewhat lower decomposition temperature such as a peroxide, an azo-ether (such as in U.S. Pat. No. 3,776,885), and an azo-ester with appropriate substituents giving them a lower decomposition temperature. The azo ester (I) can also be combined with crosslinking peroxides having rather low decomposition temperatures, such as perketals and percarbonate esters. The azo-ester (I) can also be combined with typical blowing agents, such as azodicarbonamide, sulfohydrazines, NaHCO$_3$ plus carboxylic acids, etc. This azo ester (I) can also be combined in a mixture with both a crosslinking agent having a lower decomposition temperature and a blowing agent.

Examples of the azo-esters (I) of the present invention are:
1. 2,2'-azo-bis(2-formyloxy-propane),
2. 2,2'-azo-bis(2-acetoxy-propane),
3. 2,2'-azo-bis(2-propionoxy-propane),
4. 2,2'-azo-bis(2-benzoyloxy-propane),
5. 1,1'-azo-bis(1-formyloxy-cyclohexane),
6. 1,1'-azo-bis(1-acetoxy-cyclohexane),
7. 1,1'-azo-bis(1-propionoxy-cyclohexane),
8. 1,1'-azo-bis(1-benzoyloxy-cyclohexane),
9. 2,2'-azo-bis(2-formyloxy-4-methyl-pentane),
10. 2,2'-azo-bis(2-acetoxy-4-methyl-pentane),
11. 2,2'-azo-bis(2-acetoxy-butane),
12. 1,1'-azo-bis(1-acetoxy-1-phenyl-ethane),
13. 1,1'-azo-bis(1-acetoxy-methyl-cyclohexane),
14. 1,1'-azo-bis(1-acetoxy-3,3,5-trimethyl-cyclohexane),
15. γ,γ'-azo-bis(γ-valerolactone),
16. 2,2'-azo-bis(2-acetoxy-3-methylbutane),
17. 1,1'-azo-bis(1-acetoxy-4-methylcyclohexane)
18. 1-t-butylzao-1-acetoxycyclohexane
19. 2-t-butylazo-2-acetoxybutane
20. 2-t-butylazo-2-acetoxy-4-methylpentane
21. 2-t-butylazo-2-acetoxy-5-methylhexane, and
22. 1-t-butylazo-1-acetoxy-3,3,5-trimethylcyclohexane Examples of polymers that can be either crosslinked or crosslinked and foamed with the azo-ester (I) are: polyethylene, ethylene-vinylacetate-copolymer, ethylene-propylene-copolymer(EPM), ethylene-propylene-diene-terpolymer (EPDM), styrene-butadiene-rubber, acrylonitrile-butadiene-styrene-rubber, etc.

A crosslinkable polymer composition can contain besides the polymer and the crosslinking agent other normally present agents for crosslinking compositions, such as coagents promoters, reinforcing materials, fillers (charcoal, TiO$_2$, CaCo$_3$, calcium silicate, and aluminum silicate), antioxidants, etc.

This invention will be more clearly understood by the following specific examples in which, unless otherwise stated, parts (or percent) are by weight.

EXAMPLES

These examples illustrate the crosslinking of polymers and copolymer with various azo crosslinking agents of the generic formula I.

The polymer to be crosslinked was mixed homogeneously as a powder with 5 percent by weight of the crosslinking agent in a solvent such as acetone or dichloromethane. The solvent was then evaporated from the mixture; mixing of polymer powder and crosslinking agent was also possible without using a solvent; the residue was crosslinked for 40 minutes at temperatures about 200° C. at atmospheric pressure. The amount of crosslinking agent used in each example was always equal to 5 percent by weight (relative to the 100% pure crosslinking agent) rather than being equivalent to each other because the use of equivalent amounts of crosslinking agents for their comparative evaluation does not give a very substantial statement.

The determination of the degree of crosslinking was carried out in the usual manner as follows: The crosslinked polymer was cut into strips, wrapped in a steel net having fine meshes and extracted for one hour by refluxing with xylene (80 ml xylene for 2 grs. crosslinked polymer). The steel net was then rinsed with warm xylene; the xylene was evaporated completely at 150° C. and the loss of weight which corresponded to the dissolved portion of polymer was determined. From this finding, the undissolved polymer portion gave the degree of crosslinking (expressed in percent of the original polymer weight).

Example I (Example of orientation)

Low density, high pressure polyethylene powder (density = 0.918) with a melting index of 70 grs./10 min. was crosslinked with 5% of each of the following crosslinking agents for 30 minutes at 190° C. under atmospheric pressure:

| | Crosslinking agents (not equivalent amounts) | Degree of crosslinking |
|---|---|---|
| a) | 5% Dicumylperoxide | 78% |
| b) | 5% 2,5-Bis(t-butylperoxy)-2,5-dimethyl-hexyne-(3) | 79% |
| c) | 5% 1,3,5-Tris(2-(t-butylperoxy)-propyl-(2))-benzene | 92% |
| d) | 5% 1,1'-Azo-bis(1-methoxy-cyclohexane) (=Azo-ether) | 95% |
| e) | 5% 1,1'-Azo-bis(1-acetoxy-cyclohexane) | 5% |
| f) | 5% 1,1'-Azo-bis(1-acetoxy-1-phenyl-ethane) | 27% |

The azo-ester e) was crosslinked again, but this time at a temperature 20° C higher, namely 30 minutes at 210° C under atmospheric pressure:

| | | |
|---|---|---|
| g) | 5% 1,1'-Azo-bis(1-acetoxy-cyclohexane) | 86% |

These tests demonstrate that the azo-esters of the invention are able to reach crosslinking degrees of the same magnitude as peroxides and azo-ethers but only at higher temperatures.

EXAMPLE II

Low density, high pressure polyethylene powder (density = 0.918) with a melting index of 70 grs./10 min. was crosslinked with 5% of each of the following crosslinking agents for 40 minutes at 205° C. under atmospheric pressure:

| | Crosslinking agents (not equivalent amounts) | Degree of crosslinking |
|---|---|---|
| a) | 5% 1,1-Bis(t-butylperoxy)-3,3,5-trimethyl-cyclohexane | 82% |
| b) | 5% t-Butyl-perbenzoate | 85% |
| c) | 5% Dicumylperoxide | 82% |
| d) | 5% α,α'-Bis (t-butylperoxy)-diisopropyl-benzene | 89% |
| e) | 5% 2,5-Bis(t-butylperoxy)-2,5-dimethyl-hexyne-(3) | 83% |
| f) | 5% 1,1'-Azo-bis(1-methoxy-cyclohexane) (=Azo-ether) | 71% |
| g) | 5% 2,2'-Azo-bis(2-acetoxy-propane) | 78% |
| h) | 5% 2,2'-Azo-bis(2-acetoxy-4-methyl-pentane) | 74% |
| i) | 5% 1,1'-Azo-bis(1-acetoxy-cyclohexane) | 75% |
| j) | 5% γ,γ'-Azo-bis(γ-valerolactone) | 64% |

The value of 64% for the azovalerolactone of (j) is rather low. The % crosslinking of the azo-esters of (g), (h) and (i) lies between that of the peroxides and that of the azo-ether of (f). The polyethylene crosslinked with the azo-compounds of (f) to (j) was fine-porously foamed.

EXAMPLE III

Low density, high pressure polyethylene powder (density = 0.918) with a melting index of 70 grs./10 min. was crosslinked with 5% of each of the following crosslinking agents for 40 minutes at 210° C. under atmospheric pressure:

| | Crosslinking agents (not equivalent amounts) | Degree of crosslinking |
|---|---|---|
| a) | without crosslinking agent | 10% |
| b) | 5% Lauroylperoxide | 65% |
| c) | 5% 5-butyl-peroctoate | 76% |
| d) | 5% 1,1-bis(t-butylperoxy)-3,3,5-trimethyl-cyclohexane | 77% |
| e) | 5% t-butyl-per-3,5,5-trimethyl-hexanoate | 69% |
| f) | 5% 3,3-bis(t-butylperoxy)-butyric acid-ethylester | 75% |
| g) | 5% Dicumylperoxide | 75% |
| h) | 5% 2,5-bis(t-butylperoxy)-2,5-dimethyl-hexane | 74% |
| i) | 5% 2,5-Bis(t-butylperoxy)-2,5-dimethyl-hexyne-(3) | 79% |
| j) | 5% 1,1'-azo-bis(1-methoxy-cyclohexane) (=Azo-ether) | 71% |
| k) | 5% 2,2'-azo-bis(2-acetoxy-propane) | 75% |
| l) | 5% 2,2'-azo-bis(2-acetoxy-4-methyl-pentane) | 71% |
| m) | 5% 1,1'azo-bis(1-acetoxy-cyclohexane) | 79% |
| n) | 5% 1,1'-azo-bis(1-acetoxy-3,3,5-trimethyl-cyclohexane) | 71% |
| o) | 5% 1,1'-azo-bis(1-acetoxy-1-phenyl-ethane) | 40% |

The percent of crosslinking obtained with the azo-esters (k,l,m,n) has the same order of magnitude as that obtained by the azo-ether (j) and the peroxides. The polyethylene crosslinked with the azo compounds (j) to (o) was fine-porously foamed.

EXAMPLE IV

Low density, high pressure polyethylene powder (density = 0.915–0.918) with a melting index of 17–22 grs./10 min. was crosslinked with 5% of each of the following crosslinking agents for 40 minutes at 210° C. under atmospheric pressure:

| | Crosslinking agents (not equivalent amounts) | Degree of crosslinking |
|---|---|---|
| a) | without crosslinking agents | 2.7% |
| b) | 5% 2,2'-Azo-bis-isobutyronitrile | 4,3% |
| c) | 5% Di(3,5,5-trimethylhexanoyl)-peroxide | 63% |
| d) | 5% t-butyl-peroctoate | 55% |
| e) | 5% 1,1-bis(t-butylperoxy)-3,3,5-trimethyl-cyclohexane | 80% |
| f) | 5% t-butyl-per-3,5,5-trimethylhexanoate | 46% |
| g) | 5% t-butyl-perbenzoate | 82% |
| h) | 5% 3,3-bis(t-butylperoxy)-butyric acid-ethylester | 74% |
| i) | 5% dicumylperoxide | 81% |
| j) | 5% α,α'-bis(t-butylperoxy)-diisopropyl-benzene | 54% |
| k) | 5% 2,5-bis(t-butylperoxy)-2,5-dimethyl-hexane | 81% |
| l) | 5% 2,5-bis(t-butylperoxy)-2,5-dimethyl-hexyne-(3) | 84% |
| m) | 5% 1,1'-azo-bis(1-methoxy-cyclohexane) (azo-ether) | 73% |
| n) | 5% 1,1'-azo-bis(1-phenoxy-cyclohexane) (azo-ether) | 78.5% |
| o) | 5% 2,2'-azo-bis(2-acetoxy-propane) | 63% |
| p) | 5% 2,2'-azo-bis(2-acetoxy-butane) | 59% |
| q) | 5% 2,2'-azo-bis(2-acetoxy-4-methyl-pentane) | 78.5% |
| r) | 5% 1,1'-azo-bis(1-acetoxy-cyclohexane) | 70% |
| s) | 5% 1,1'-azo-bis(1-acetoxy-methylcyclohexane) | 70% |
| t) | 5% 1,1'-azo-bis(1-acetoxy-3,3,5-trimethyl-cyclohexane) | 86% |
| u) | 5% 1,1'-azo-bis(1-acetoxy-1-phenyl-ethane) | 60% |
| v) | 5% γ,γ'-azo-bis(γ-valerolactone) | 41% |

Azo-esters (u), (p) and (v) show a relatively low % crosslinking. The degree of crosslinking of the other azo-esters amounts again to the same order of magnitude as that of the azo-ethers (m and n) and that of the peroxides usable as crosslinkers (e, g, h, i, j, k, l), at which (j), with 54% crosslinking is out of place. The 2,2'-azo-bis-isobutyronitrile (b) belonging to the group of azo-compounds with tertiary carbon atoms shows, as expected, no crosslinking ability, whereas the two peroxides (c) and (d) having similar low initiation temperatures like azobisisobutyronitrile effect crosslinking of more than 50%. Note the high degree of crosslinking of 86% obtained by the azo-ester (t). The polyethylene crosslinked with the azo compounds (m) to (v) was fine-porously foamed.

EXAMPLE V

This example gives a comparison of the decomposition temperatures of azo-esters, azo-ethers and peroxides. Low density, high pressure polyethylene powder (density = 0.915–0.918) with a melting index of 17–22 grs./10 min. was crosslinked with 5% of each of the following crosslinking agents for 40 minutes at 170°, 180° C., 190° C., 200° C., 218° C. and 220° C. under atmospheric pressure:

| Crosslinking agents (not equivalent amounts) | Degree of crosslinking at | | | | | |
|---|---|---|---|---|---|---|
| | 170° C | 180° C | 190° C | 200° C | 210° C | 220° C |
| a) without crosslinking agent | 0.23% | 1.9% | 2.6% | 2.8% | 3.4% | 4.0% |
| b) 5% dicumylperoxide | 88.5% | 88% | 93.5% | 92% | 91% | 94% |
| c) 5% 1,1'-azo-bis(1-methoxy-cyclohexane) | 1.6% | 29.5% | 79.5% | 82.5% | 75% | 74% |
| d) 5% 2,2'-azo-bis(2-acetoxy-4-methyl-pentane) | 10.5% | 28.6% | 81% | 79% | 82% | 81% |
| e) 5% 1,1'-azo-bis(1-acetoxy-cyclohexane) | 2.1% | 2.2% | 2.0% | 2.6% | 4.0% | 77% |

In this experiment the dicumylperoxide had already crosslinked below 170° C.; the azo-ether (c) between 180° C. and 190° C.; but the azo-ester (e) not before 210°–220° C. The azo-ester (d), however, had crosslinked already between 180°–190° C. (just as the azo-ether (c) had); this is the effect of a common rule for azo initiators that alkyl-substitution in β-position to the carbon atom connected with the azo group causes an increase of activity (i.e., decrease of decomposition temperature); such β-position represents the 4-position in the azo-ester (d) or the 3- and 5-positions in the cyclohexane ring (see azo-ester (t) in example 4). The polyethylene crosslinked with the azo compounds (c) to (e) was fine-porously foamed.

EXAMPLE VI

Low molecular ethylene-vinylacetate-copolymer powder (EVA-powder) with an ethylene portion of 37% and a vinylacetate portion 63% and a melting index at 190° C. of approx. 25 grs./100min., containing 6% precipitated silicic acid, was crosslinked with 5% of each of the following crosslinking agents for 40 minutes at 220° C. under atmospheric pressure:

| Crosslinking agents (not equivalent amounts) | Degree of Crosslinking |
|---|---|
| a) without crosslinking agent | 25% |
| b) 5% lauroylperoxide | 27% |
| c) 5% t-butyl-peroctoate | 49% |
| d) 5% dicumylperoxide | 79% |
| e) 5% 1,1'-azo-bis(1-methoxy-cyclohexane) (azo-ether) | 80% |
| f) 5% 2,2'-azo-bis(2-acetoxy-propane) | 74% |
| g) 5% 2,2'-azo-bis(2-acetoxy-4-methyl-pentane) | 76% |
| h) 5% 1,1'-azo-bis(1-acetoxy-cyclohexane) | 46% |
| i) 5% γ,γ'-azo-bis(γ-valerolactone) | 85% |

With the exception of (h) the percent of crosslinking of the azo-esters was in the same range as that of the azo-ether (e) and of dicumylperoxide (d). The azo-ester (h), having here only a low effectiveness, has always been very effective in polyethylene crosslinking. Note the good crosslinking effect of the azovalerolactone (i) for EVA (85%). The EVA crosslinked with the azo compounds (e) to (i) was fine-porously foamed.

EXAMPLE VII

Low density, high pressure polyethylene powder (density = 0.918) with a melting index of 70 grs./10 min. was crosslinked with combinations of the following azo compounds (azo-esters) (total quantity of crosslinking agent 5%) for 40 minutes at 215° C. under atmospheric pressure:

| Crosslinking agents (not equivalent amounts) | Degree of crosslinking |
|---|---|
| a) 2.5% 2,2'-azo-bis(2-acetoxy-propane) +2.5% 1,1'-azo-bis(1-acetoxy-cyclohexane) | 79% |
| b) 2.5% 1,1'-azo-bis(1-acetoxy-cyclohexane) +2.5% γ,γ'-azo-bis(γ-valerolctone) | 78% |
| c) 1.7% 2,2'-azo-bis(2-acetoxy-propane) +1.7% 1,1'-azo-bis(1-acetoxy-cyclohexane) +1.7% 2,2'-azo-bis(2-acetoxy-4-methyl-pentane) | 74% |

Combinations of the inventive azo-esters gave the same good degrees of crosslinking as each of these azo-esters when used individually. The polyethylene was fine-porously foamed.

EXAMPLE VIII

Low density, high pressure polyethylene powder (density = 0.918) with a melting index of 70 grs./10 min was crosslinked with double combinations of peroxides having high decomposition temperatures and azo-esters (a, b, c) and a combination of an azo-ether effective as crosslinking agent and an azo-ether (d) in comparison with 1 peroxide (f), 1 azo-ester (g) and a combination of 2 azo-esters (e) (total quantity of crosslinking agents 5%) for 40 minutes at 215° C. under atmospheric pressure:

| Crosslinking agents (not equivalent amounts) | Degree of crosslinking |
|---|---|
| a) 2.5% dicumylperoxide +2.5% 2,2'-azo-bis(2-acetoxy-propane) | 80% |
| b) 2.5% 2,5-dimethyl-2,5-bis(t-butylperoxy)-hexyne-(3) +2.5% 1,1'-azo-bis(1-acetoxy-cyclohexane) | 75% |
| c) 2.5% 1,3,5-tris(2-(t-butylperoxy)-propyl-(2))-benzene +2.5% 2,2'-azo-bis(2-acetoxy-4-methyl-pentane) | 75% |
| d) 2.5% 1,1'-azo-bis(1-methoxy-cyclohexane) (=azo-ether) +2.5% 1,1'-azo-bis(1-acetoxy-cyclohexane) | 73% |
| e) 2.5% 2,2'-azo-bis(2-acetoxy-propane) +2.5% 1,1'-azo-bis(1-acetoxy-cyclohexane) | 84% |
| f) 5% dicumylperoxide | 86% |
| g) 5% 1,1'-azo-bis(1-acetoxy-cyclohexane) (azo-ester) | 82% |

Combinations of crosslinking agents of different structures (peroxide, azo-ether, azo-ester) also give good degrees of crosslinking situated a little lower than those obtained with peroxide or azo-ester alone or with 2 azo-esters. The polyethylene was fine-porously foamed, except (f) (5% dicumylperoxide) which gave a polyethylene essentially unfoamed with exception of some bubbles because dicumylperoxide forms gaseous products, like methane, on thermal decomposition in polyethylene.

EXAMPLE IX

Low density, high pressure polyethylene powder (density = 0.918) with a melting index of 70 grs./10 min. was crosslinked with double combinations of foaming agent (azodicarbonamide) and azo-ester, and further with triple combinations of foaming agent (azodicarbonamide), peroxide having a high decomposition temperature or azo-ether and azo-ester for 40 minutes at 225° C. under atomspheric pressure (total quantity of crosslinking agents of 5%). In comparison crosslinking was performed under the same conditions with 2 peroxides, 2 azo-esters, the foaming agent azodicarbonamide and azobisisobutyronitrile as signle agents:

| | Crosslinking agents (not equivalent amounts) | Degree of crosslinking |
|---|---|---|
| a) | 1.5% azodicarbonamide +5% 2,2'-azo-bis(2-acetoxy-propane) | 66% |
| b) | 1,5% azodicarbonamide + 5% 1,1'-azo-bis(1-acetoxy-cyclohexane) | 68% |
| c) | 1.5% azodicarbonamide + 2.5% dicumylperoxide + 2.5% 2,2'-azo-bis(2-acetoxy-propane) | 77% |
| d) | 1.5% azodicarbonamide + 2.5% 2,5-dimethyl-2,5-bis(t-butylperoxy)-hexyne-(3) + 2.5% 1,1'-azo-bis(1-acetoxy-cyclohexane) | 75% |
| e) | 1.5% azodicarbonamide + 2.5% 1,1'-azo-bis(1-methoxy-cyclohexane) (=azo-ether) + 2.5% 2,2'-azo-bis(2-acetoxy-propane) | 75% |
| f) | without additions | 8% |
| g) | 1.5% azodicarbonamide | 30% |
| h) | 5% azobisisobutyronitrile | 15% |
| i) | 5% dicumylperoxide | 79% |
| j) | 5% 2,5-dimethyl-2,5-bis(t-butylperoxy)-hexyne-(3) | 91% |
| k) | 5% 2,2'-azo-bis(2-acetoxy-propane) | 73% |
| l) | 5% 1,1'-azo-bis(1-acetoxy-cyclohexane) | 70% |

In the presence of the foaming agent (azodicarbonamide) the obtained degrees of crosslinking were somewhat lower than without a foaming agent. The azodicarbonamide containing compositions (a) to (e) and (g) were coarse-porously foamed, (h), (k) and (l) fine-porously foamed, (i) and (j) unfoamed with exception of some bubbles and (f) unfoamed.

EXAMPLE X

Low density, high pressure polyethylene powder (density = 0.915–0.918) with a melting index of 17–22 grs./10 min. was crosslinked with double combinations of foaming agent (azodicarbonamide) and azo-ester, and further with triple combinations of foaming agent (azodicarbonamide), peroxide having a high decomposition temperature of azo-ether and azo-ester for 40 minutes at 225° C. under atmospheric pressure and under the same conditions with 2 peroxides, 2 azo-esters, the foaming agent azodicarbonamide and azo-bisisobutyronitrile as single agents. The total quantity of crosslinking agents amounted in all cases to 5%

| | Crosslinking agents (not equivalent amounts) | Degree of crosslinking |
|---|---|---|
| a) | 1.5% azodicarbonamide + 5% 2,2'-azo-bis(2-acetoxy-propane) | 26% |
| b) | 1.5% azodicarbonamide + 5% 1,1'-azo-bis(1-acetoxy-cyclohexane) | 43% |
| c) | 1.5% azodicarbonamide + 2.5% dicumylperoxide + 2.5% 2,2'-azo-bis(2-acetoxy-propane) | 67% |
| d) | 1.5% azodicarbonamide + 2.5% 2,5-dimethyl-2,5-bis(t-butylperoxy)-hexyne-(3) + 2.5% 1,1'-azo-bis(1-acetoxy-cyclohexane) | 78% |
| e) | 1.5% azodicarbonamide + 2.5% 1,1'-azo-bis(1-methoxy-cyclohexane) (=azo-ether) + 2.5% 2,2'-azo-bis(2-acetoxy-propane) | 78% |
| f) | without additions | 5% |
| g) | 5% azobisisobutyronitrile | 4% |
| h) | 5% dicumylperoxide | 79% |
| i) | 5% 2,5-dimethyl-2,5-bis(t-butylperoxy)-hexyne-(3) | 89% |
| j) | 5% 2,2'-azo-bis(2-acetoxy-propane) | 74% |
| k) | 5% 1,1'-azo-bis(1-acetoxy-cyclohexane) | 79% |

As in Example IX the degree of crosslinking in the presence of the foaming agent (azodicarbonamide) was lower than without the foaming agent. The azodicarbonamide containing compositions of (a) to (e) were coarse-porously foamed; (g), (j) and (k) fine-porously foamed; (h) and (i) unfoamed except for some bubbles; and (f) unfoamed.

EXAMPLE XI

Low density, high pressure polyethylene powder (density = 0.918) with a melting index of 70 grs./10 min. was crosslinked with different quantities (0.2%–5%) of one of the inventive azo-esters, namely the 2,2'-azo-bis(2-acetoxy-propane) and in comparison with dicumylperoxide for 40 minutes at 220° C. under atmospheric pressure:

| Amount of crosslinking agents | Degrees of crosslinking obtained with: | |
|---|---|---|
| | 2,2'-azo-bis (2-acetoxy-propane) | dicumyl-peroxide |
| 0 % | 0,5% | 0.5% |
| 0.2% | 7 % | |
| 0.4% | 25 % | |
| 0.5% | 28 % | 72 % |
| 0.6% | 33 % | |
| 0.8% | 60 % | |
| 1.0% | 62 % | 70 % |
| 1.5% | 71 % | |
| 2 % | 76 % | 71 % |
| 3 % | 80 % | 72 % |
| 4 % | 81 % | 77 % |
| 5 % | 82 % | 58 % |

Whereas dicumylperoxide reaches almost the maximal degree of crosslinking in a concentration of 0, 5%, the azo-ester does this in concentrations of 1—1, 5%. The polyethylene crosslinked with the azo compound was fine-porously foamed.

EXAMPLE XII

This experiment illustrates the crosslinking of polyethylene with 1,1'-azo-bis(1-formyloxy-cyclohexane) (R = H) which had not yet been used in the existing examples and with the analogous acetoxy product, 1,1'-azo-bis(1-acetoxy-cyclohexane) (R = CH$_3$) at different temperatures. Low density, high pressure polyethylene powder (density = 0.918) with a melting index of 70 grs./10 min. was crosslinked with 5% of the above mentioned azo compounds for 40 minutes at 190° C., 200° C., 210° C., 220° C., and 230° C. under atmospheric pressure:

| Crosslinking agents (not equivalent amounts) | Degree of crosslinking at | | | | | |
|---|---|---|---|---|---|---|
| | 180° C | 190° C | 200° C | 210° C | 220° C | 230° C |
| a) 5% 2,2'-azo-bis(2-acetoxy-4-methyl-pentane) | 39% | 70% | 69% | 63% | 63% | 60% |
| b) 5% 2,2'-azo-bis(2-acetoxy-propane) | 3% | 7% | 44% | 69% | 70% | 78% |
| c) 5% γ,γ'-azo-bis(γ-valerolactone) | 4% | 4% | 4% | 82% | 78% | 74% |
| d) 5% 1,1'-azo-bis(1-acetoxy-cyclohexane) | 0% | 3% | 4% | 5% | 70% | 78% |

| | Degrees of crosslinking obtained with | |
|---|---|---|
| Crosslinking Temperature | 5% 1,1'-azo-bis(1-formyloxy-cyclohexane) | 5% 1,1'-azo-bis(1-acetoxy-cyclohexane) |
| 190° C | 2.7% | 3.7% |
| 200° C | 4.0% | 4.0% |
| 210° C | 13.5% | 78 % |
| 220° C | 79 % | 82 % |
| 230° C | 78 % | 74 % |

This experiment shows that the formyloxy compound has a higher decomposition temperature than the actoxy compound. In both cases the polyethylene was fine-porously foamed.

EXAMPLE XIII

Low density, high pressure polyethylene powder (density = 0.918) with a melting index of 70 grs./10 min. was crosslinked with 5% of each of four crosslinking agents (two peroxides and two azo-esters) for 40 minutes at temperatures from 120° C. to 220° C. under atmospheric pressure. This experiment shows the temperature differences between the decomposition temperature of the azo-esters and that of the crosslinking peroxides having a high decomposition temperature. The degree of crosslinking at the decomposition temperature is underlined:

| | Degrees of crosslinking obtained with 5% of each of the following 4 crosslinking agents at the temperatures given at the left side: | | | |
|---|---|---|---|---|
| Crosslinking Temperature | 5% dicumyl-peroxide | 5% 2,5-bis(t-butylperoxy)-2,5-dimethyl-hexyne-(3) (LUPEROX 130) | 5% 2,2'-azo-bis (2-acetoxy-propane) | 5% 1,1'-azo-bis (1-acetoxy-cyclohexane) |
| 120° C | 9.5% | 0.05% | — | — |
| 130° C | 62 % | 0.1 % | — | — |
| 140° C | 62 % | 33 % | — | — |
| 150° C | 86 % | 56 % | — | — |
| 160° C | 91 % | 78 % | — | — |
| 170° C | 91 % | 78 % | 0.3% | 2.5% |
| 180° C | 91 % | 78 % | 3 % | 5 % |
| 190° C | 88 % | 78 % | 5 % | 5 % |
| 195° C | — | — | 18 % | — |
| 200° C | 76 % | 87 % | 65 % | 5 % |
| 205° C | — | — | 71 % | 5 % |
| 210° C | — | — | 80 % | 80 % |
| 220° C | — | — | 80 % | 80 % |

EXAMPLE XIV

This experiment illustrates the determination of the decomposition temperature of γ,γ-azo-bis(γ-valerolacetone) in crosslinking of polyethylene. For comparison the three azo-esters, 2,2'-azo-bis(2-acetoxy-4-methyl-pentane), 2,2'-azo-bis-(2-acetoxy-propane) and 1,1'-bis(1-acetoxy-cyclohexane) were also tested.

Low density, high pressure polyethylene powder (density = 0.918) with a melting index of 70 grs./10 min. was crosslinked with 5% of each of the four above mentioned azo-esters for 40 minutes at 180°–230° C. under atmospheric pressure:

The polyethylene was fine-porously foamed.

EXAMPLE XV

By this experiment the *minimum-crosslinking-time* necessary to obtain a good degree of crosslinking was ascertained. As a representative for all the azo-esters of this invention the 2,2'-azo-bis(2-acetoxy-propane) was used as crosslinking agent. Low density, high pressure polyethylene powder (density=0.918) with a melting index of 70 grs./10 min. was crosslinked with 5% of this azo-ester at 215° C. for 5, 10, 15, 20, 25, 30, 35 and 40 minutes under atmospheric pressure:

| Crosslinking times | Degrees of crosslinking obtained with 5% 2,2'-azo-bis(2-acetoxy-propane) at 215° C |
|---|---|
| 5 minutes | 0.5 % |
| 10 minutes | 72 % |
| 15 minutes | 75 % |
| 20 minutes | 77 % |
| 25 minutes | 75 % |
| 30 minutes | 75 % |
| 35 minutes | 75 % |
| 40 minutes | 75 % |

The maximum degree of crosslinking was obtained in about 10 minutes.

EXAMPLE XVI

In the present example, polyethylene was crosslinked under pressure. For this purpose low density high pressure polyethylene powder (density=0.918) with a melting index of 70 g/10 min. containing 5% 2,2'-azo-bis(2-acetoxy-propane), homogeneously worked in, was crosslinked under pressure in a cylinder between two movable pistons exactly fitted in at 240° C. for 3 hours. The cylinder and pistons were between two metal sheets pressed against each other by means of 4 bolts and nuts. During crosslinking the nuts were tightened several times.

By this procedure a thin crosslinked *bubblefree* polyethylene plate was obtained being 70% crosslinked.

EXAMPLE XVII

This experiment illustrates the determination of the decomposition temperature of 2,2'-azo-bis(2-acetoxy-butane) and of 2,2'-azo-bis (2-acetoxy-3-methyl-butane) in crosslinking of polyethylene. For comparison the 2,2'-azo-bis(2-acetoxy-propane) was also tested.

Low density, high pressure polyethylene powder (density = 0.918) with a melting index of 70 grs./10 min. was crosslinked with 5% of each of the three above mentioned azo-esters for 40 minutes at temperatures between 160°–230° C. under atmospheric pressure:

| Crosslinking Temperatures | Degrees of crosslinking obtained with 5% of each of the following 3 crosslinking agents at the temperatures given at the left side: | | |
|---|---|---|---|
| | 5% 2,2'-azo-bis (2-acetoxy-propane) | 5% 2,2'-azo-bis (2-acetoxy-butane) | 5% 2,2'-azo-bis (2-acetoxy-3-methyl-butane) |
| 160° C | 0 % | 0 % | 0 % |
| 170° C | 0.3% | 3.5% | 0.5% |
| 180° C | 0.5% | 5 % | 1.0% |
| 190° C | 9 % | 6 % | 69 % |
| 200° C | 78 % | 68 % | 73 % |
| 210° C | 82 % | 80 % | 72 % |
| 220° C | 78 % | 72 % | 67 % |
| 230° C | — | 69 % | — |

The polyethylene was fine-porously foamed.

EXAMPLE XVIII

Five different synthetic rubbers were crosslinked with two peroxides (one perketal and one dialkylperoxide) and four azo-esters for 40 minutes at 220° C. at atmospheric pressure. Of the crosslinking agents 5% of each were used; they were worked into the rubber by means of a roll at about 80°–100° C.

The determination of the degree of crosslinking was carried out in the same way as described before for polyethylene, thus by extraction with boiling xylene (80 ml xylene for 1 gr of crosslinked rubber). Under these conditions the untreated rubber dissolved almost completely (to 99%–100%), thus showing a degree of crosslinking of 0–1%.

| Crosslinking agent (not equivalent amounts) | following 5 rubbers: | | | | |
|---|---|---|---|---|---|
| | Buna[1] AP 201 | Buna[2] AP 241 | Buna[3] AP 258 | Buna[4] huls 1502 | Buna[5] CB 10 |
| (a) 5% 1,1-bis(t-butyl-peroxy)-3,3,5-trimethyl-cyclohexane | 79% | 85% | 68% | 76% | 98% |
| b) 5% dicumyl-peroxide | 53% | 91% | 79% | 94% | 98% |
| c) 5% 2,2'-azo-bis(2-acetoxy-propane) | 1.5% | 55% | 74% | 93% | 98% |
| d) 5% 2,2'-azo-bis(2-acetoxy-butane) | 0.8% | 63% | 78% | 93% | 98% |
| e) 5% γ,γ'-azo-bis(γ-valero-lactone) | 1.6% | 70% | 65% | 75% | 97% |
| f) 5% 1,1'-azo-bis(1-acetoxy-cyclohexane) | 0.1% | 83% | 82% | 91% | 97% |

[1] Buna AP 201: Ethylene-Propylene-Rubber
[2] Buna AP 241: Ethylene-Propylene-Ethylidenenorbornene-Rubber, very fast.
[3] AP 258: Ethylene-Propylene-Ethylidenenorbornene-Rubber, extremely fast.
[4] Buna huls 1502: Styrene-Butadiene-Rubber.
[5] Buna CB 10: Polybutadiene-Rubber.

The ethylene-propylene-rubber (= Buna AP 201), containing no double bonds, was not crosslinked at all by the azo-esters. The other four rubbers, containing double bonds, were crosslinked by peroxides and azo-esters to almost the same degree.

The rubbers treated with the azo-esters were intensively foamed.

EXAMPLE XIX

In this example polyethylene was crosslinked with 5% azo-ester or peroxide in the presence of 5% soot. Low density, high pressure polyethylene powder (density = 0.918) with a melting index of 70 grs./10 min. was mixed with 5% soot and 5% crosslinking agent (azo-ester or peroxide) and afterwards crosslinked 40 minutes at 215° C. under atmospheric pressure:

| Crosslinking agent (not equivalent amounts) | Degree of crosslinking |
|---|---|
| a) without soot and crosslinking agent | 5% |
| b) 5% soot, without crosslinking agent | 10% |
| c) 5% soot + 5% 1,1-bis(t-butylperoxy)-3,3,5-trimethyl-cyclohexane | 65% |
| d) 5% soot + 5% dicumylperoxide | 84% |
| e) 5% soot + 5% 2,2'-azo-bis(2-acetoxy-propane) | 84% |
| f) 5% soot + 5% 2,2'-azo-bis(2-acetoxy-butane) | 85% |
| g) 5% soot + 5% 2,2'-azo-bis(2-acetoxy-4-methyl-pentane) | 72% |
| h) 5% soot + 5% 1,1'-azo-bis(1-acetoxy-cyclohexane) | 75% |
| i) 5% soot + γ,γ'-azo-bis(γ-valerolactone) | 81% |

All azo-compounds tested in this example gave good degrees of crosslinking with (e), (f), and (i) crosslinking was as good as with dicumylperoxide. Thus, soot has no adverse effect on crosslinking of polyethylene with azo-esters.

The polyethylene crosslinked with azo-esters was fine-porously foamed.

EXAMPLE XX

Low density polyethylene was crosslinked with 10 meq. of the following crosslinking agents at 204.5° C. on the Monsanto Rheometer 100:

| Crosslinking Agents | 1-t-butylazo-1-acetoxycyclohexane* |
|---|---|
| $M_H$ (in-lb) | 3.50 |
| $M_L$ (in-lb) | 1.08 |
| $M_H-M_L$ (in-lb) | 2.42 |
| $T_{C90}$ (min) | 199.0 |
| $T_{S2}$ (min) | 140.0 |

*(SEE U.S. Pat. No. 4,029,615)

$M_H$ is the maximum torque; $M_L$ is the minimum torque value; $M_H-M_L$ is the difference in maximum and minimum torque values (ie., the degree of crosslinking). $T_{C90}$ is the time to 90% of $M_H-M_L$ (degree of crosslinking). $T_{S2}$ is the time to 2 inch-pound above $M_L$ (i.e., scorch time).

The polymer to be crosslinked was mixed homogeneously with the crosslinking agent by means of a C. U. Brabender mixer (roller style, fixed blade head) fitted with a liquid constant temperature circulator. The polymer was melted at 110° C. prior to the addition of crosslinking agent.

This experiment shows that 1-t-butylazo-1-acetoxycyclohexane is not an efficient crosslinking agent at 204.5° C.

EXAMPLE XXI

Low density polyethylene was crosslinked with the following unsymmetrical azo-ester for 40 minutes at 235° C. under 400 psi pressure:

| Quantity of Crosslinking Agent | Crosslinking Agent | Degree of Crosslinking |
|---|---|---|
| 5% | 1-t-butylazo-1-acetoxy- | 86% |

| -continued | | |
|---|---|---|
| Quantity of Crosslinking Agent | Crosslinking Agent | Degree of Crosslinking |
| | cyclohexane | 5 |

This experiment shows that unsymmetrical azo-esters are efficient crosslinkers of low density polyethylene at 235° C.

The degree of crosslinking was determined as follows: The crosslinked polymer was cut into strips, placed in a wire cage, and extracted 3 hours by refluxing at 110° C. with xylene (80 ml xylene for 2 gms crosslinked polymer). The cage was rinsed with xylene, and dried at 150° C. The loss of weight was determined. From the results, the undissolved portion gives the degree of crosslinking, expressed in % of the original polymer weight.

Some of the azo-compounds used in the Examples were prepared as follows:

Preparation of 1,1'-azo-bis(1-methoxy-cyclohexane)

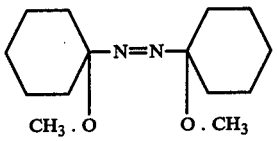

2.62 g of sodium (0.114 mols) were added to 100 ml of methanol. To the sodium methylate solution thus obtained, a solution of 10 g of 1,1'-azo-bis(1-chloro-cyclohexane) (0.038 mols) in 75 ml of n-hexane was added at 20° C. while stirring. Subsequently, the stirring was continued for 90 minutes at 25°–30° C. and the reaction mixture was poured into 400 ml of water while being stirred. The organic phase was washed with 500 ml of water and dried with K$_2$CO$_3$. The hexane was removed completely at 40° C. in vacuo. Yellow oil was obtained which solidifies when stored at 0° C., and which contains 89% of 1,1'-azo-bis(1-methoxy-cyclohexane); yield: 6.2g (57% of theory).

Preparation of 1,1'-azo-bis(1-phenoxy-cyclohexane)

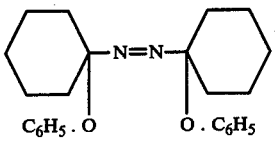

35 g of sodium phenolate x3H$_2$O (0.21 mol) were suspended in 400 ml of n-hexane. Afterwards 26.3 g of 1,1'-azo-bis(1-chlorocyclohexane) (0.10 mol) — dissolved in 100 ml of n-hexane — were added at 20° C. while stirring. To complete the reaction, the mixture was stirred for 3 hours at 20° C. and for 3 hours at 30° C. While being stirred it was poured into 400 ml of water, stirring was continued for 15 minutes and the aqueous phase separated. The organic phase was washed twice with 1 N sodium hydroxide and subsequently washed with water and dried with K$_2$CO$_3$. The hexane was removed completely in vacuo at 40° C. and the yellow residue was recrystallized from acetone. White powder was obtained having a melting point of 115°–120° C. containing 53% of 1,1'-azobis(1-phenoxy-cyclohexane); yield: 7.5g.

Preparation of 1,1'-azo-bis(1-acetoxy-methylcyclohexane)

(a) Methylcyclohexanone-azine:

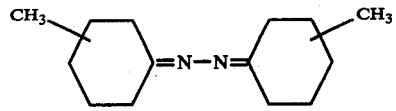

To 111 g of a methylcyclohexanone-isomer mixture (consisting of 61% 3-methyl-cyclohexanone, 31% 4-methyl-cyclohexanone and 8% cyclohexanone) (1.00 mol) was added 50 g of hydrazine-hydrate, 50% (0.50 mol) at about 20°–40° C. while stirring and cooling in a 4-necked flask, which was furnished with a reflux condenser, stirrer, dropping funnel and thermometer. Stirring was continued for 6 hours at 20° C. The whole reaction mixture was poured into a separation funnel, which was closed and kept 40 hours at room temperature. The lower aqueous phase was separated; the upper phase was washed three time with 70 ml of water and dried with about 5 g of MgSO$_4$×3H$_2$O. The obtained 103 g of raw azine were distilled under reduced pressure at 190° C./30torr yielding 74 g (68% of theory) of the methyl-cyclohexanone-azine-mixture as a yellow oil.

(b) 1,1'-azo-bis(1-chloro-methylcyclohexane)

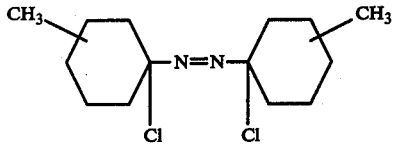

21 g of the above mentioned methylcyclohexanone-azine (0.0965 mol) were dissolved in 150 ml of CCl$_4$ in 4-necked flask, furnished with reflux condenser, stirrer, thermometer and chlorine inlet tube. While stirring and excluding atmospheric moisture about 2.6 liters of chlorine gas (about 0.105 mol) were bubbled through the solution at 10°–15° C.; stirring was continued for 10 minutes at 10°–15° C.; and subsequently a slow stream of nitrogen was blown through the entire apparatus, in order to react all the chlorine with the azine. Afterwards the CCl$_4$ was removed under reduced pressure at 60°–70° C. yielding 60 g of the 1,1'-azo-bis(1-chloro-methylcyclohexane) as a reddish brown oil with a purity of 51%.

(c) 1,1'-azo-bis(1-acetoxy-methylcyclohexane)

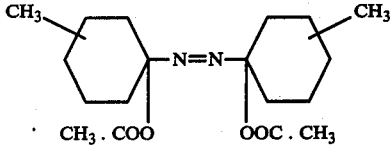

28,4 g of the above mentioned 1,1'-azo-bis(1-chloro-methylcyclohexane) were added in portions while stirring and cooling to a suspension of 41 g of anhydrous sodium acetate in 300 ml of acetic acid at about 20° C. Stirring was continued for three hours at room temperature, subsequently, the mixture was poured into 1.5 l of water and stirred for a further 30 minutes. For better separation of phases, the azo compound was dissolved in 100 ml of ethyl acetate and the total mixture allowed to separate in a separation funnel. After separation of the lower aqueous phase, the organic phase was washed with NaHCO$_3$-solution to alkaline reaction and then dried with MgSO$_4$ × 3H$_2$O. The acetic ester was removed in vacuo at 60° C. In the flask remained 51 g of 1,1'-azo-bis(1-acetoxy-methylcyclohexanone) as a dark reddish brown oil with a slight smell and a purity of 55%.

Preparation of 1,1'-azo-bis(1-acetoxy-3,3,5-trimethylcyclohexane)

(a) 3,3,5-trimethylcyclohexanone-azine

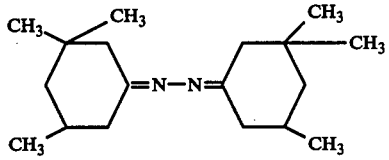

701 g of 3,3,5-trimethyl-cyclohexanone (5.0 mol) and 200 ml of isopropanol were filled into a 4-necked flask, furnished with reflux condenser, stirrer, dropping funnel and thermometer. 125 g of hydrazine-hydrate, 80% (2.0 mol) were added at temperatures beneath 40° C. while stirring and cooling. Stirring was continued for 3 ½ hours at 85° C. The mixture was poured into 1 liter of water while stirring and settled in the separating funnel. After separation of the lower aqueous phase, the organic phase was shaken with 500 ml of water; hereby the azine separated as a solid white product, which was sucked off, washed again and dried in the air. By this process 64 g (11.5% of theory) of 3,3,5-trimethyl-cyclohexanone-azine were obtained as a white powder with a melting point of 135°–137° C.

(b) 1,1'-azo-bis(1-chloro-3,3,5-trimethyl-cyclohexane)

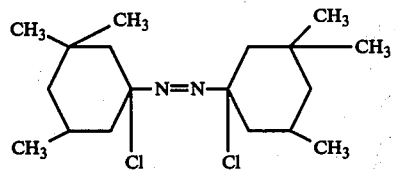

55.3 g of the above mentioned 3,3,5-trimethylcyclohexanone-azine (0.20 mol) were dissolved in 400 g of CCl$_4$ in a 4-necked flask, furnished with reflux condenser, stirrer, thermometer and chlorine inlet tube. At 10°–15° C. about 15 g of chlorine gas (about 5.3 liters, 0.21 mol) were slowly bubbled through the mixture while stirring, cooling and excluding atmospheric humidity. Stirring was continued for 10 minutes and then a slow flow of nitrogen was blown through the entire apparatus, in order to cause all of the chlorine to react with the azine. The CCl$_4$ was removed in vacuo at 60° C. thus giving 50 g (72% of theory) of the raw dichloro-azo-compound as an orange powder. After recrystallization from n-pentane 27 g (38% of theory) of the pure 1,1'-azo-bis(1-chloro-3,3,5-trimethyl-cyclohexane) were obtained as a nearly white, yellowish powder without a smell, with a melting point of 149°–151° C. and a purity of 98.1%.

(c) 1,1'-azo-bis(1-acetoxy-3,3,5-trimethyl-cyclohexane)

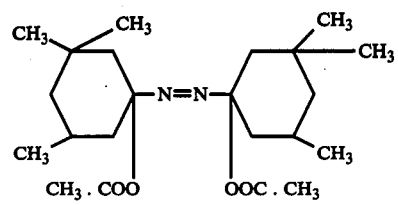

26.5 g of the above mentioned 1,1'-azo-bis(1-chloro-3,3,5-trimethyl-cyclohexane) (0.075 mol) were added in portions while stirring and cooling to a suspension of 32 g of anhydrous sodium acetate (0.39 mol) in 280 ml of acetic acid at about 20° C. The mixture was stirred for 3 hours at room temperature, then poured into 1.5 liters of water while stirring, during which the acetoxy-azo compound separated as clear fine crystalline substance, and then stirred again for 30 minutes. After filtration by sucking, washing with water and drying in the air, the 1,1'-azo-bis(1-acetoxy-3,3,5-trimethylcyclohexane) was obtained as a fine light-grey powder with a yield of 29.7 g (98% of theory) and a melting point of 109°–113° C. After recrystallization from acetone, 16 g of the white crystalline azo compound with a melting point of 111°–115° C. and an assay of 104% (determined iodometrically) were obtained.

Preparation of the 1,1'-azo-bis(1-acetoxy-cyclohexane) in one step from the cyclohexanone-azine:

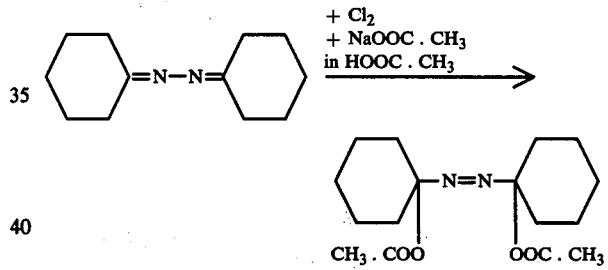

22 g of cyclohexane-azine (0.114 mol) were dissolved in 300 ml of acetic acid in a 4-necked flask, furnished with CaCl$_2$-tube, stirrer, thermometer and chlorine inlet tube. Then 38 g of anhydrous sodium acetate (0.464 mol) were added. The mixture was stirred for 10 minutes and then 8.5 g of chlorine (about 3 liter 0.12 mol) were slowly bubbled through the suspension at 20° C. excluding atmospheric humidity. Subsequently a slow stream of nitrogen was blown through the entire apparatus and stirring was continued for 30 minutes at 20° C. While stirring, the reaction mixture was poured into 2 liters of water — during which the azo compound separated as a fine crystalline product; then stirring was continued for another 30 minutes; the product was separated and washed well with water and dried in the air. By this process 25 g (71% of theory) of the 1,1'-azo-bis(1-acetoxy-cyclohexane) were obtained as a nearly colourless, light yellowish, crystalline powder with a melting point of 91°–94° C. and a purity of 99%.

Preparation of 2,2-azo-bis(2-acetoxy-4-methyl-pentane) in one step from methyl isobutyl ketone-azine:

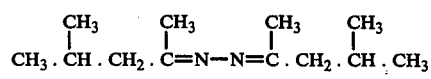

-continued

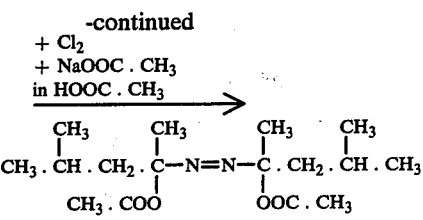

30 g of methyl isobutyl ketone-azine (0.153 mol) were dissolved in 400 ml of acetic acid in a 4-necked flask, furnished with CaCl$_2$-tube, stirrer, thermometer and chlorine inlet tube. 50 g of anhydrous sodium acetate (0.61 mol) were added to the flask; it was stirred 10 minutes and 11.6g (about 4.1 liters) of chlorine (0.164 mol) slowly was bubbled through the suspension at 20° C. under exclusion of atmospheric humidity. Subsequently a slow stream of nitrogen was blown through the entire apparatus and stirring was continued for 1 hour at 20° C. The reaction mixture was poured into 1.5 liters of water while stirring, during which the azo compound separated as oil; stirring was continued for another 30 minutes; the mixture was settled in a separation funnel and the lower aqueous phase was separated. The upper azo phase was washed with NaHCO$_3$-solution until an alkaline reaction occurred. After separation of the aqueous phase, the azo compound was dried with MgSO$_4$ × 3H$_2$O. Thus, 31.5 g (64% of theory) of the 2,2'azo-bis(2-acetoxy-methyl-pentane) were obtained as a yellowish oil with a moderate smell and a purity of 97%.

Preparation of 1,1'-azo-bis(1-formyloxy-cyclohexane) in one step from cyclohexanone-azine:

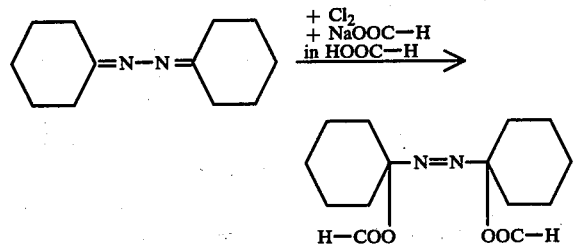

64 g anhydrous sodium formate (0.94 mols) were added to 300 ml anhydrous formic acid in a 4-necked flask furnished with CaCl$_2$-tube, stirrer, thermometer and chlorine inlet tube. Then 44 g of cyclohexanone-azine were added at 20° C. by stirring which was continued for 10 minutes; the mixture was cooled to 0° C. and 17.6 g (about 6.2 liters; 0.248 mols) of chlorine were slowly bubbled through the suspension at 0° C. (cooling with ice/sodium chloride) excluding atmospheric humidity. Subsequently, a slow stream of nitrogen was blown through the entire apparatus; stirring was continued for 1 ½ hours in the following manner: 15 minutes at 0° C., 15 minutes at +5° C., 15 minutes at +10° C., 15 minutes at +15° C., 15 minutes at +20° C. and 15 minutes at +25° C. While stirring, the reaction mixture was poured into 2 liters of water during which the azo compound separated as a white fine crystalline product; then stirring was continued for 20 minutes; the product was separated and washed with water. The azo compound was suspended in 800 ml of 8% sodium bicarbonate solution, stirred for 20 minutes, filtered by vacuum, washed well with water and dried in the air. By this process 49.5 g (77% of theory) of the 1,1'-azo-bis(1-formyloxy-cyclohexane) were obtained as a snowwhite, odourless crystalline powder with a melting point of 97°–99.5° C. and a purity of 99.5%. The azo compound was not shock sensitive, did not show any signs of decomposition up to 200° C. and had no explosive properties (in the pressure vessel test a value of < 1 mm. was found).

(SEE: D. C. NOLLER, ET AL, IND. & ENG. CHEM. 56, NO. 12, 18–27 (1964)) After repeated recrystallizations from acetone, colourless crystals with a melting point of 99°–100.5° C. were obtained.

| Elementary analysis: | C$_{14}$ | H$_{22}$ | N$_2$ | O$_4$ ; MW = 282,33 |
|---|---|---|---|---|
| calc.: | 59.55% | 7.85% | 9.92% | 22.67% |
| found: | 59.89% | 7.82% | 10.00% | 22.29% |
| | | | | (O ascertained from difference) |

Preparation of 2,2'-azo-bis(2-acetoxy-butane) in one step from methyl ethyl ketone-azine:

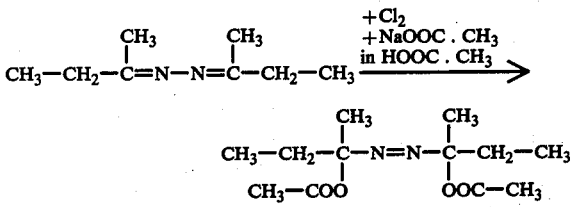

114 g anhydrous sodium acetate (1.39 mols) were added to 900 ml anhydrous acetic acid in a 4-necked flask furnished with CaCl$_2$-tube, stirrer, thermometer and chlorine inlet tube. Then 96 g of methyl-ethyl-ketone-azine (0.684 mols) were added at 20° C. by stirring. Stirring is continued for 10 minutes and 48.6 g (about 17.2 liters) chlorine (0.684 mols) were slowly bubbled through the suspenseion at 22°–28° C. by stirring excluding atmospheric humidity. When approximately 4/10 of these 17.2 liters of chlorine were introduced, an additional 114 g of anhydrous sodium acetate (1.39 mols) were added slowly within 5–10 minutes. Stirring was continued for 1 hour at 30° C. While stirring, the reaction mixture was poured into 2250 ml of water and stirring was continued for 15 minutes. After separation of the aqueous phase, the liquid azo-compound was washed with 300 ml of a 6% NaHCO$_3$-solution while stirring 30 minutes. After separation from the aqueous phase, the same bicarbonate wash was repeated. It was followed by a wash with 210 NaCl-solution, 14% and drying with 20 g MgSO$_4$. The 2,2'-azo-bis(2-acetoxy-butane) obtained was having a greenish, brownish agreeable ketone-like smelling liquid having a yield of 121 g (68% of theory) and a purity of 99%; density = 1.007 at 20° C.; n$^{20}$ = 1.4360.

Preparation of 2,2'-azo-bis(2-acetoxy-3-methyl-butane) in one step from methyl isopropyl ketone-azine:

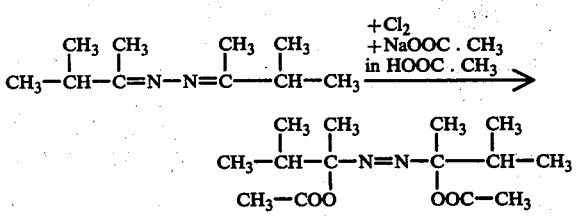

76 g anhydrous sodium acetate (0.926 mols) were added to 600 ml anhydrous acetic acid in a 4-necked flask furnished with a CaCl$_2$-tube, stirrer, thermometer and chlorine inlet tube. Then 38.3 g of methyl-isopropyl-ketone-azine (0.228 mols) were added at 20° C. by stirring. Stirring was continued for 10 minutes and 16.2 g (about 5,7 liters) chlorine (0.228 mols) were slowly bubbled through the suspension at 22° C. while stirring and excluding atmospheric humidity. Stirring was continued for ½ hour at +22° C., ½ hour at +26° C. and 1 hour at 30° C. The reaction mixture was poured on 1200 ml of ice water while stirring; stirring was continued for 15 minutes and the azo-compound solidified. It was filtered by suction, washed with water and dissolved in 150 ml pentane. This pentane solution was washed twice with 200 ml NaHCO$_3$-solution, 6% for 30 minutes while stirring, once with 210 ml NaCl-solution, 14%, dried with Na$_2$SO$_4$ and the pentane evaporated in vacuo at 20° to 30° C. yielding the 2,2'-azo-bis(2-acetoxy-3-methyl-butane) as a weakly greenish, strongly smelling, crystalline product; yield: 26 g (40% of theory), melting point: 55°-62° C.; purity: 98%. By recrystallization (2 times) from the 10-fold quantity of aqueous ethanol, 60%, the pure azo compound was obtained as a white odourless fine-crystalline product with a melting point of 62° to 64° C.

| Elementary analysis: | C$_{14}$ | H$_{26}$ | N$_2$ | O$_4$; | MW=286,36 |
|---|---|---|---|---|---|
| calc.: | 58.72% | 9.15% | 9.78% | 22.35% | |
| found: | 58.24% | 8.90% | 10.34% | 22.52% | |
| | | | | (O ascertained from difference) | |

What is claimed:

1. The process of crosslinking or simultaneously cross-linking and foaming a polymer selected from the group consisting of polyethylene, ethylene-vinyl acetate copolymer, ethylene-propylene copolymer, ethylene-propylene-diene terpolymer, styrene-butadiene rubber, acrylonitrile-butadiene-styrene rubber, ethylene-propylene-ethylidene-norbornene rubber, and polybutadiene rubber comprising:

(a) mixing with 100 parts by weight of said polymer 0.5 to 20% by weight of a composition including at least one azo-ester cross-linking and foaming agent of the formula:

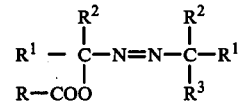

in which
R is selected from the group consisting of H, lower alkyl, cycloalkyl, aryl and aralkyl;
R$^1$ and R$^2$ are independently selected from the group consisting of alkyl, cycloalkyl, aryl and aralkyl wherein each of the groups may have alkyl branching;
R$^1$ and R$^2$ can join together to form R$^1$R$^2$ group where the group is selected from —(CH$_2$)$_4$—, —(CH$_2$)$_5$—, alkylsubstituted tetramethylene or alkyl-substituted pentamethylene;
R and R$^1$ can join together to form RR$^1$ group where the group is selected from —(CH$_2$)$_2$—, —(CH$_2$)$_3$—, alkylsubstituted —(CH$_2$)$_2$— or alkylsubstituted —(CH$_2$)$_3$—; and
R$^3$ is selected from the group consisting of —OOC—R, alkyl, cycloalkyl and aralkyl; and (b) in the absence of an activator which lowers the decomposition temperature of the cross-linking and foaming agent when the composition is heated, heating the polymer mixture at a temperature above 170° C. but not to the point where the polymer will substantially degrade and a pressure of 0 to 300 psia until cross-linking or crosslinking and foaming are effected.

2. The process of claim 1 wherein the polymer mixture is heated in a temperature range of 180°-230° C. at atmospheric pressure.

3. The process of claim 1 wherein the composition comprises an azo ester in combination with a member selected from an azo-ether or peroxide.

4. The process of claim 1 wherein the composition comprises two different azo esters of formula (I).

5. The process of claim 1 wherein the composition is 2,2'-azo-bis(2-acetoxy-propane).

6. The process of claim 1 wherein the composition is 2,2'-azo-bis(2-acetoxy-butane).

7. The process of claim 1 wherein the composition is one azo ester of formula (I) and at least one member selected from the group consisting of a foaming agent, azo-ether and organic peroxide.

* * * * *